(12) United States Patent
Yum et al.

(10) Patent No.: US 10,181,964 B2
(45) Date of Patent: Jan. 15, 2019

(54) METHOD AND APPARATUS FOR CHANNEL ESTIMATION

(71) Applicant: LG ELECTRONICS INC., Seoul (KR)

(72) Inventors: Kunil Yum, Seoul (KR); Youngtae Kim, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 15/121,465

(22) PCT Filed: Mar. 2, 2015

(86) PCT No.: PCT/KR2015/001980
§ 371 (c)(1),
(2) Date: Aug. 25, 2016

(87) PCT Pub. No.: WO2015/167119
PCT Pub. Date: Nov. 5, 2015

(65) Prior Publication Data
US 2016/0365990 A1    Dec. 15, 2016

Related U.S. Application Data

(60) Provisional application No. 61/987,507, filed on May 2, 2014.

(51) Int. Cl.
*H04B 7/06*     (2006.01)
*H04L 25/02*    (2006.01)
(Continued)

(52) U.S. Cl.
CPC ......... *H04L 25/0202* (2013.01); *H04B 17/24* (2015.01); *H04B 17/309* (2015.01);
(Continued)

(58) Field of Classification Search
CPC .......... H04B 3/32; H04B 3/23; H04B 7/0478; H04B 7/0639; H04B 7/0695; H04B 7/10;
(Continued)

(56) References Cited

U.S. PATENT DOCUMENTS 9,838,184 B2 * 12/2017 Kang .................... H04B 7/0626
9,843,423 B2 * 12/2017 Kang .................... H04B 7/0617
(Continued)

OTHER PUBLICATIONS

Intel Corporation, "Potential Performance Improvement in FD-MIMO Systems," 3GPP TSG-RAN WG1 #76 R1-140126, Prague, Czech Republic, Feb. 10-14, 2014, pp. 1-3.

*Primary Examiner* — James M Perez
(74) *Attorney, Agent, or Firm* — Birch, Stewart, Kolasch & Birch, LLP

(57) ABSTRACT

A method for reporting a channel state of a terminal performed by the terminal is disclosed. The method includes receiving a channel state information-reference signal (CSI-RS) configuration for verifying validity of channel estimation using only a part of two-dimensional (2D) array antenna ports configured for the terminal, verifying the validity of the channel estimation using CSI-RS configuration and obtaining a channel estimation validity indicator, and transmitting the channel estimation validity indicator and channel state information based on the channel estimation validity indicator.

14 Claims, 11 Drawing Sheets

(51) Int. Cl.
  *H04B 17/24* (2015.01)
  *H04B 17/345* (2015.01)
  *H04B 17/309* (2015.01)

(52) U.S. Cl.
  CPC ....... *H04B 17/345* (2015.01); *H04L 25/0204* (2013.01); *H04L 25/0224* (2013.01); *H04L 25/0242* (2013.01)

(58) Field of Classification Search
  CPC ............ H04B 7/0805; H04L 25/03343; H04L 25/497; H04L 25/03057; H04W 52/42; H04W 16/28; H04M 1/00
  USPC .................................. 375/259–285, 316–352
  See application file for complete search history.

(56) References Cited

U.S. PATENT DOCUMENTS

| | | | | |
|---|---|---|---|---|
| 9,866,303 B2* | 1/2018 | Ko | | H04B 7/0456 |
| 9,867,060 B2* | 1/2018 | Inoue | | H04W 16/28 |
| 9,876,548 B2* | 1/2018 | Vook | | H04B 7/0478 |
| 9,900,068 B2* | 2/2018 | Park | | H04B 7/0469 |
| 9,967,013 B2* | 5/2018 | Kang | | H04B 7/0617 |
| 10,056,956 B2* | 8/2018 | Rahman | | H04B 7/0478 |
| 2013/0039349 A1* | 2/2013 | Ebrahimi Tazeh Mahalleh | | H04L 1/0013 370/336 |
| 2013/0083681 A1* | 4/2013 | Ebrahimi Tazeh Mahalleh | | H04L 5/0057 370/252 |
| 2013/0242773 A1* | 9/2013 | Wernersson | | H04B 7/024 370/252 |
| 2013/0272151 A1* | 10/2013 | Thomas | | H04W 24/02 370/252 |
| 2013/0308715 A1* | 11/2013 | Nam | | H04B 7/0469 375/267 |
| 2014/0016549 A1* | 1/2014 | Novlan | | H04B 7/0417 370/328 |
| 2014/0098689 A1* | 4/2014 | Lee | | H04B 7/0469 370/252 |
| 2015/0236828 A1* | 8/2015 | Park | | H04L 5/0094 375/340 |
| 2015/0288499 A1* | 10/2015 | Nam | | H04L 1/0026 370/329 |
| 2015/0341091 A1* | 11/2015 | Park | | H04B 7/0456 375/267 |
| 2015/0341093 A1* | 11/2015 | Ji | | H04B 1/707 375/267 |
| 2015/0341099 A1* | 11/2015 | Kang | | H04B 7/0626 375/267 |
| 2016/0028519 A1* | 1/2016 | Wei | | H04B 7/0456 375/267 |
| 2016/0056875 A1* | 2/2016 | Kang | | H04B 7/0456 370/329 |
| 2016/0080052 A1* | 3/2016 | Li | | H04B 7/0456 375/267 |
| 2016/0080058 A1* | 3/2016 | Kang | | H04B 7/0617 370/329 |
| 2016/0192229 A1* | 6/2016 | Liu | | H04L 1/0026 455/423 |
| 2016/0212643 A1* | 7/2016 | Park | | H04B 7/0626 |
| 2016/0344525 A1* | 11/2016 | Kang | | H04B 7/0469 |
| 2016/0359538 A1* | 12/2016 | Onggosanusi | | H04B 7/0469 |
| 2016/0373224 A1* | 12/2016 | Kim | | H04B 7/0469 |
| 2016/0380734 A1* | 12/2016 | Wang | | H04L 5/0057 370/329 |
| 2017/0019159 A1* | 1/2017 | Vook | | H04B 7/0478 |
| 2017/0070277 A1* | 3/2017 | Si | | H04B 7/0413 |
| 2017/0195017 A1* | 7/2017 | Kim | | H04B 7/0417 |
| 2017/0244533 A1* | 8/2017 | Onggosanusi | | H04B 7/0478 |
| 2017/0279514 A1* | 9/2017 | Rahman | | H04B 7/0469 |
| 2017/0310378 A1* | 10/2017 | Kim | | H04B 7/04 |
| 2018/0006845 A1* | 1/2018 | Kim | | H04B 7/0478 |
| 2018/0041264 A1* | 2/2018 | Ko | | H04B 7/0469 |
| 2018/0083681 A1* | 3/2018 | Faxer | | H04B 7/0413 |
| 2018/0098234 A1* | 4/2018 | Kim | | H04L 5/0053 |
| 2018/0102817 A1* | 4/2018 | Park | | H04B 7/04 |
| 2018/0115357 A1* | 4/2018 | Park | | H04B 7/04 |
| 2018/0123668 A1* | 5/2018 | Kwak | | H04B 7/0626 |

* cited by examiner (a)

(b)

METHOD AND APPARATUS FOR CHANNEL ESTIMATION

CROSS REFERENCE TO RELATED APPLICATIONS

This application is the National Phase of PCT International Application No. PCT/KR2015/001980, filed on Mar. 2, 2015, which claims priority under 35 U.S.C. 119(e) to U.S. Provisional Application No. 61/987,507, filed on May 2, 2014, all of which are hereby expressly incorporated by reference into the present application.

TECHNICAL FIELD

The present invention relates to a wireless communication system and, more particularly, to a method and an apparatus for reporting a channel state through channel estimation using some antenna ports.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as, a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

The present invention proposes a scheme for reporting a channel state, and proposes a signaling scheme related to a more efficient channel state report using the scheme.

Technical problems to be solved in the present invention are not limited to the above-mentioned technical problem, and other technical problems not mentioned will be clearly understood by those skilled in the art from description below.

Technical Solution

The object of the present invention can be achieved by providing a method for reporting a channel state of a terminal performed by the terminal, the method including receiving a channel state information-reference signal (CSI-RS) configuration for verifying validity of channel estimation using only a part of two-dimensional (2D) array antenna ports configured for the terminal, verifying the validity of the channel estimation using the CSI-RS configuration and obtaining a channel estimation validity indicator, and transmitting the channel estimation validity indicator and channel state information based on the channel estimation validity indicator.

Additionally or alternatively, the obtaining may include measuring a correlation between an actual channel from a part of antenna ports corresponding to the CSI-RS configuration and a channel from some antenna ports obtained through the channel estimation, and determining a value of the channel estimation validity indicator by comparing the measured correlation with a threshold.

Additionally or alternatively, the channel estimation validity indicator may be set to 0 when the measured correlation is greater than or equal to the threshold, and the channel estimation validity indicator may be set to 1 when the measured correlation is less than the threshold.

Additionally or alternatively, the channel state information may include a rank indicator (RI) and a precoding matrix indicator (PMI) for antenna ports corresponding to a specific column among the 2D array antenna ports, an RI and a PMI for antenna ports corresponding to a specific row among the 2D array antenna ports, and an integrated channel quality indicator (CQI) for antenna ports corresponding to the specific column and the specific row when the channel estimation validity indicator indicates that the channel estimation is valid.

Additionally or alternatively, the channel state information may include an RI, a PMI and a CQI for antenna ports corresponding to a specific column among the 2D array antenna ports, or an RI, a PMI and a CQI for antenna ports corresponding to a specific row among the 2D array antenna ports when the channel estimation validity indicator indicates that the channel estimation is invalid.

Additionally or alternatively, the method may further include receiving information about the part of the 2D array antenna ports configured for the terminal.

Additionally or alternatively, the channel estimation may be based on a Kronecker product.

In another aspect of the present invention, provided herein is a terminal configured to cancel interference, including a radio frequency (RF) unit, and a processor configured to control the RF unit, wherein the processor is configured to receive a CSI-RS configuration for verifying validity of channel estimation using only a part of two-dimensional (2D) array antenna ports configured for the terminal, verify the validity of the channel estimation using the CSI-RS configuration and obtain a channel estimation validity indicator, and transmit the channel estimation validity indicator and channel state information based on the channel estimation validity indicator.

Additionally or alternatively, the processor may be further configured to measure a correlation between an actual channel from a part of antenna ports corresponding to the CSI-RS configuration and a channel from some antenna ports obtained through the channel estimation, and determine a value of the channel estimation validity indicator by comparing the measured correlation with a threshold.

Additionally or alternatively, the channel estimation validity indicator may be set to 0 when the measured correlation is greater than or equal to the threshold, and the channel estimation validity indicator may be set to 1 when the measured correlation is less than the threshold.

Additionally or alternatively, the channel state information may include an RI and a PMI for antenna ports corresponding to a specific column among the 2D array antenna ports, an RI and a PMI for antenna ports corresponding to a specific row among the 2D array antenna ports, and an integrated CQI for antenna ports corresponding to the specific column and the specific row when the channel estimation validity indicator indicates that the channel estimation is valid.

Additionally or alternatively, the channel state information may include an RI, a PMI and a CQI for antenna ports corresponding to a specific column among the 2D array antenna ports, or an RI, a PMI and a CQI for antenna ports corresponding to a specific row among the 2D array antenna ports when the channel estimation validity indicator indicates that the channel estimation is invalid.

Additionally or alternatively, the process may be further configured to receive information about the part of the 2D array antenna ports configured for the terminal.

Additionally or alternatively, the channel estimation may be based on a Kronecker product.

It should be noted that the above-mentioned technical solutions are merely a part of embodiments of the present invention, and various embodiments reflecting technical characteristics of the present invention may be derived and understood by those skilled in the art from detailed description of the present invention to be described below.

Advantageous Effects

According to an embodiment of the present invention, it is possible to report a channel state through channel estimation using some antenna ports, thereby raising efficiency in configuring antenna ports for the channel state report and efficiently reporting the channel state.

Effects that may be obtained from the present invention are not limited to the above-mentioned effects, and other effects not mentioned may be clearly understood by those skilled in the art from description below.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
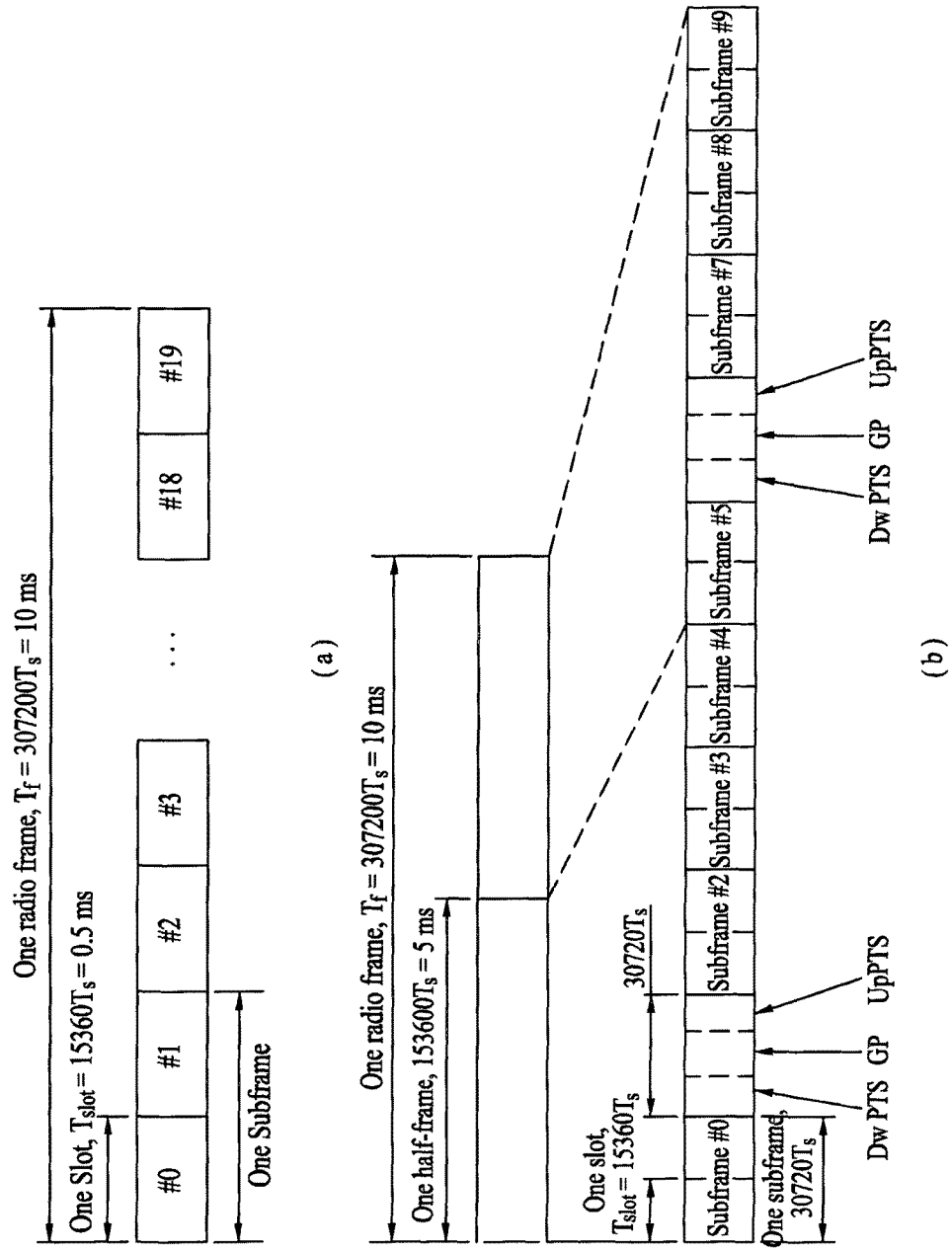
FIG. 1 is a diagram illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
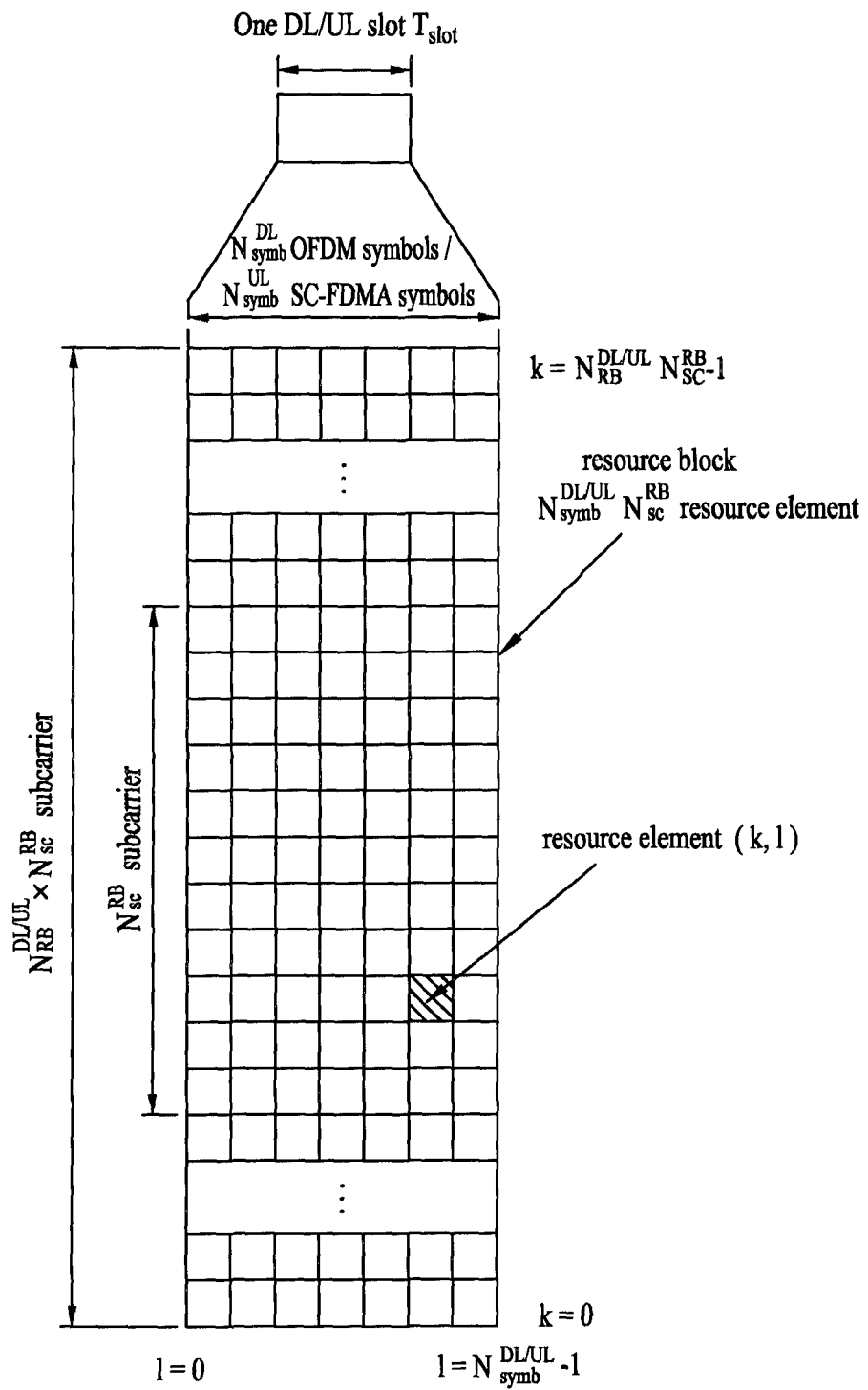
FIG. 2 is a diagram illustrating an example of a structure of a downlink/uplink (DL/UL) slot in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{SC}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in and uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{SC}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{SC}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
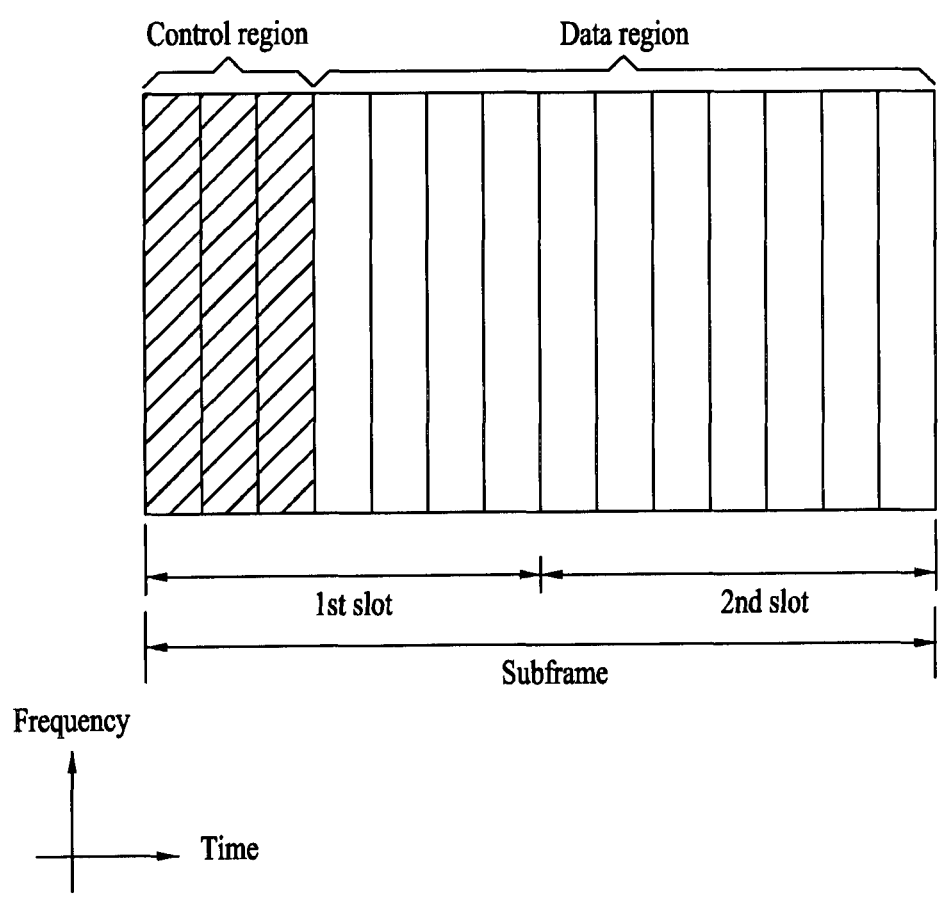
FIG. 3 is a diagram illustrating an example of a structure of a DL subframe used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAD, etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCL In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $m^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
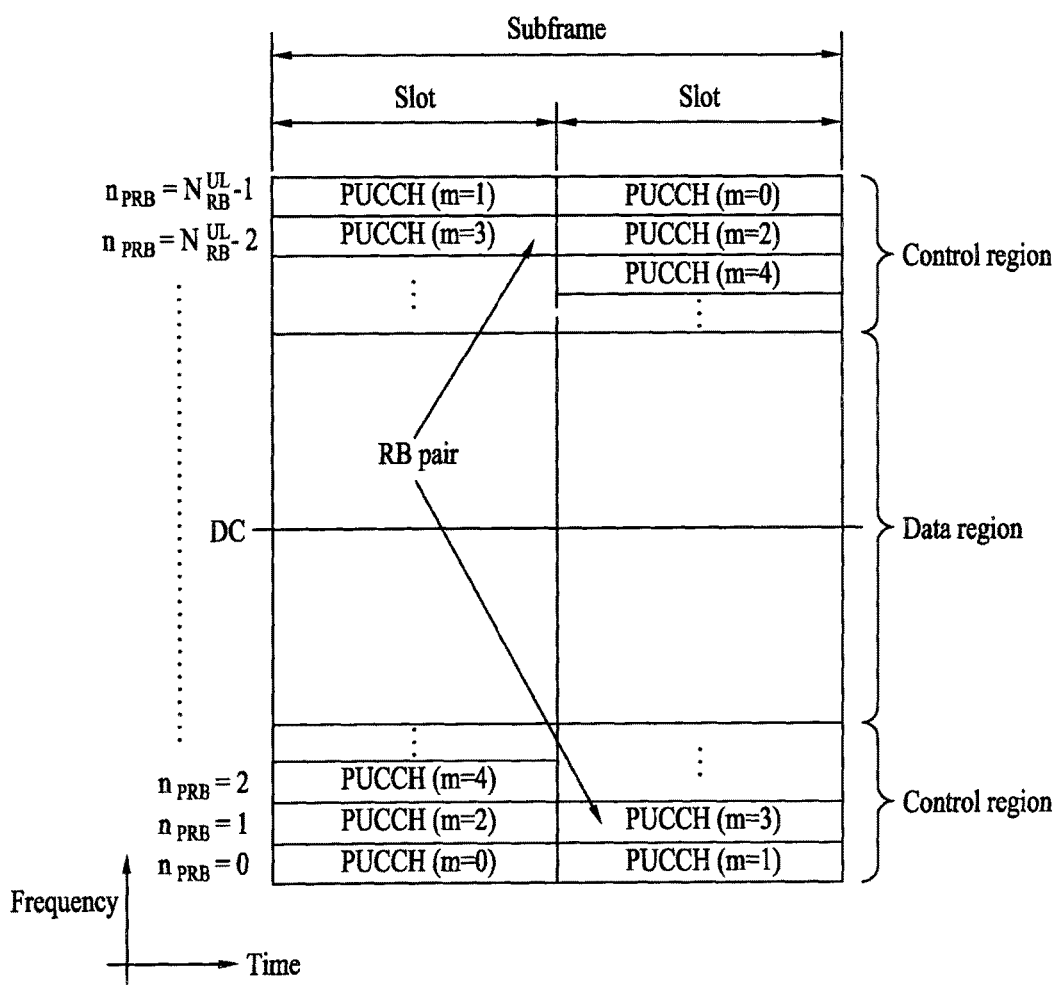
FIG. 4 is a diagram illustrating an example of a structure of a UL subframe used in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (00K) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI ($W_1$) and a short term/subband PMI ($W_2$). In other words, a final PMI is expressed by a function of $W_1$ and $W_2$. For example, the final PMI W may be defined as follows: $W=W_1*W_2$ or $W=W_2*W_1$. Accordingly, in LTE-A, a CSI may be composed of RI, $W_1$, $W_2$ and CQI.

In the 3GPP LTE(-A) system, an uplink channel used for CSI transmission is shown in Table 5 below.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH After Receiving CSI Transmission Request Control Signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4bit) 2nd wideband CQI(4bit) if RI > 1 N*Subband PMI(4bit) (N is the total # of subbands) (if 8Tx Ant, N*subband W2 + wideband W1) |
| | UE selected (Subband CQI) | Mode 2-0 RI (only for Open-loop SM) 1st wideband CQI(4bit) + Best-M CQI(2bit) (Best-M CQI: average CQI for selected M SB(s) among N SBs) Best-M index (L bit) | | Mode 2-2 RI 1st wideband CQI(4bit) + Best-M CQI(2bit) 2nd wideband CQI(4bit) + Best-M CQI(2bit) if RI > 1 Best-M index (L bit) Wideband PMI(4bit) + Best-M PMI(4bit) (if 8Tx Ant, wideband W2 + Best-M W2 + wideband W1) |
| | Higher Layer-configured (Subband CQI) | Mode 3-0 RI (only for Open-loop SM) 1st wideband CQI(4bit) + N*subbandCQI(2bit) | Mode 3-1 RI 1st wideband CQI(4bit) + N*subbandCQI(2bit) 2nd wideband CQI(4bit) + N*subbandCQI(2bit) if RI > 1 Wideband PMI(4bit) (if 8Tx Ant, wideband W2 + wideband W1) | Mode 3-2 RI 1st wideband CQI(4bit) + N*subbandCQI(2bit) 2nd wideband CQI(4bit) + N*subbandCQI(2bit) if RI > 1 N*Subband PMI(4bit) (N is the total # of subbands) (if 8Tx Ant, N*subband W2 + wideband W1) |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 2: A wideband CQI and a PMI (WB-CQI/PMI) are transmitted.

iii) Type 3: An RI is transmitted.

iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 7, the transmission periodicity of the wideband CQI/PMI and the subband CQI is P and has the following properties.

The wideband CQI/PMI has periodicity of H*P. At this time, H=J*K+1, wherein J denotes the number of BPs and K denotes the number of periodicities of the BP. That is, the UE performs transmission at {0, H, 2H, . . . }.

The CQI is transmitted at a time of J*K rather than when the wideband CQI/PMI is transmitted.

In Table 7, the transmission periodicity of the RI is a multiple m of that of the wideband CQI/PMI and has the following properties.

The offsets of the RI and the wideband CQI/PMI are 0 and, if the RI and the wideband CQI/PMI are transmitted in the same subframe, the wideband CQI/PMI is not transmitted.

Parameters P, H, K and O described in Table 7 are all determined at the higher layer of the UE and signaled to a physical layer of the UE.

The present invention proposes a scheme in which a UE transmits, to an eNB, information related to validity of a channel estimation method when a channel is estimated through the Kronecker product.

Figure 5:
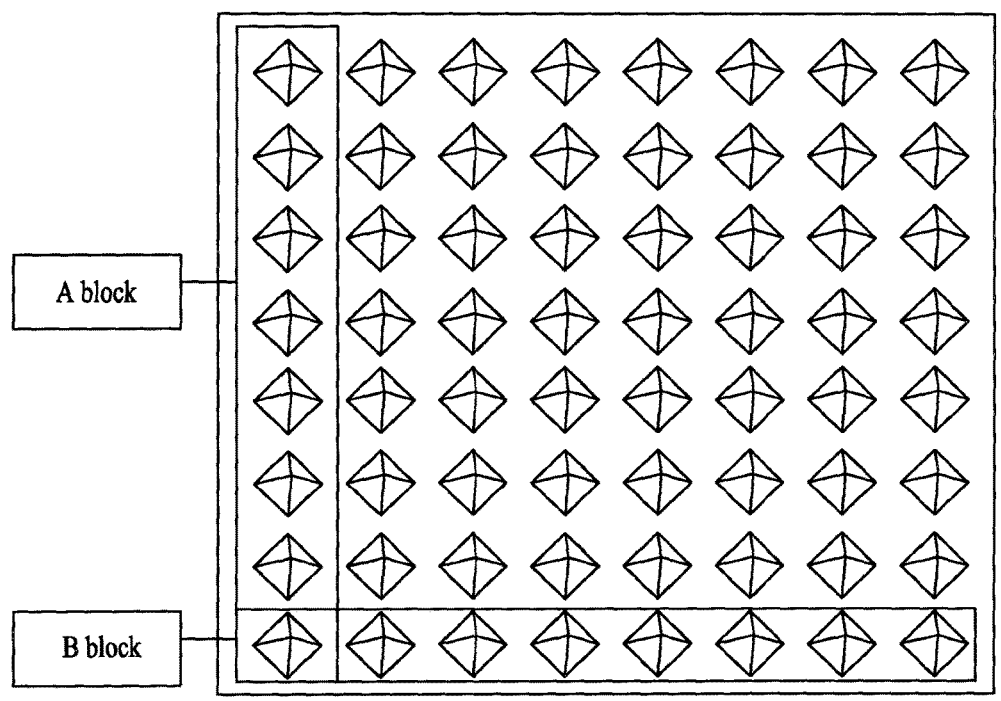
FIG. 5 is a diagram illustrating some antenna ports selected from a two-dimensional (2D) antenna array of the wireless communication system to which an embodiment of the present invention is applied.

After LTE Rel-12, an antenna system using an active antenna system (AAS) is to be introduced. The AAS includes active antennas, each of which includes an active circuit, and thus is expected to be a technology that can be more efficiently applied to reduce interference or perform beamforming by changing an antenna pattern according to a circumstance. When the AAS is two-dimensionally configured (2D-AAS), a main lobe of an antenna may be more efficiently and three-dimensionally adjusted in terms of antenna pattern, thereby more actively changing a transmission beam based on a location of a receiving end. The 2D-AAS is expected to configure a multi-antenna system by disposing antennas in a vertical direction and a horizontal direction as illustrated in FIG. 5.

When the 2D-AAS is introduced, a transmitting end may need to transmit a particular RS (for example, a CSI-RS, hereinafter, referred to as a "CSI-RS" for convenience) in order to inform the receiving end of a channel from the transmitting end to the receiving end. In a current LTE system, the CSI-RS is configured as a 1-port CSI-RS, a 2-port CSI-RS, a 4-port CSI-RS or an 8-port CSI-RS. Each of n-port CSI-RSs (n>1) needs to use n REs for one RB. Thus, when the 2D-AAS includes a total of 64 antenna ports by including eight antennas in the vertical direction and eight antennas in the horizontal direction, 64 REs need to be used for one RB for the CSI-RS in a conventional scheme. Therefore, there may be a problem of CSI-RS overhead resulting from the increased number of antennas.

To solve this problem, a scheme has been recently proposed to use a part of CSI-RS ports to estimate channels received by remaining ports. Even though there are various schemes for the scheme, the present invention presumes a case in which channels from the 2D-AAS to the receiving end are estimated by the Kronecker product as below.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix} \quad \text{[Equation 1]}$$

In the above Equation, H denotes all channels from the transmitting end to the receiving end, and $H_T^{(j)}$ denotes a channel from the transmitting end to a jth receive antenna. $H_V^{(j)}$ and $H_H^{(j)}$ denote channels transmitted to a jth antenna of the receiving end from vertical and horizontal antenna ports (or antenna elements), respectively. Referring to FIG. 5, $H_V^{(j)}$ denotes channels from antennas of a block A to the jth antenna of the receiving end on the assumption that only the antennas of the block A are present, and H denotes channels from antennas of a block B to the jth antenna of the receiving end on the assumption that only the antennas of the block B are present. For convenience, description is given of one arbitrary receive antenna, and all processes may be applied to other receive antennas. Hereinafter, description will be given only using a channel from the transmitting end to the one arbitrary receive antenna excluding the index j.

$$H_T = H_V \otimes H_H \quad \text{[Equation 2]}$$

Equation 2 is an equation for describing the present invention, and an actual channel may not be the same as Equation 2.

Two CSI-RSs in total may be configured for the CSI-RS by configuring a first CSI-RS transmitted from $N_V$ vertical antenna ports as the block A of FIG. 5 and a second CSI-RS transmitted from $N_H$ horizontal antenna ports as the block B of FIG. 5. In addition, the receiving end may measure the two CSI-RSs, and then estimate two channel matrices using the Kronecker product as in Equation 2. Here, $N_V$ denotes the number of antennas in the vertical direction, and $N_H$ denotes the number of antennas in the horizontal direction. In this way, it is possible to inform the receiving end of a channel transmitted by a 64-port CSI-RS using existing 2, 4 and 8-port CSI-RSs.

However, a channel estimated by the Kronecker product may not be exactly the same as an actual channel. When the channel significantly has a characteristic of a single path (for example, in a light of sight (LOS) environment), a correlation between the actual channel and the channel estimated by the Kronecker product is significantly high. However, in a non-LOS (NLOS) environment having a multipath propagation characteristic, it is difficult to ensure a high correlation between the actual channel and the channel estimated by the Kronecker product, and thus it is difficult to sufficiently and accurately acquire a characteristic of the channel through the Kronecker product. To properly estimate a channel using the Kronecker product in this circumstance, the UE and the eNB need to know validity of channel estimation using the Kronecker product and perform an appropriate operation.

In this regard, an embodiment of the present invention proposes a scheme in which the UE transmits, to the eNB, validity information of a channel when the channel is estimated through the Kronecker product.

The UE may inform the eNB of whether a channel which is currently fed back may be reconfigured by the Kronecker product using a 1-bit indicator. The indicator is referred to as an estimation validity indicator (EVI). An example of the EVI is shown in the following Table.

TABLE 8

| EVI | Description |
| --- | --- |
| 0 | Channel Estimation valid |
| 1 | Channel Estimation invalid |

Unlike the above Table, it may be set the EVI to 1 when the channel estimation is valid, and otherwise the EVI may be set to 0.

When the UE transmits EVI=0 to the eNB, the eNB reconfigures full channel information through the Kronecker product using horizontal and vertical channel information which is fed back. When the UE transmits EVI-1 to the eNB, the eNB may perform another operation for more accurate channel estimation (for example, deliver another CSI-RS configuration to the UE).

Figure 6:
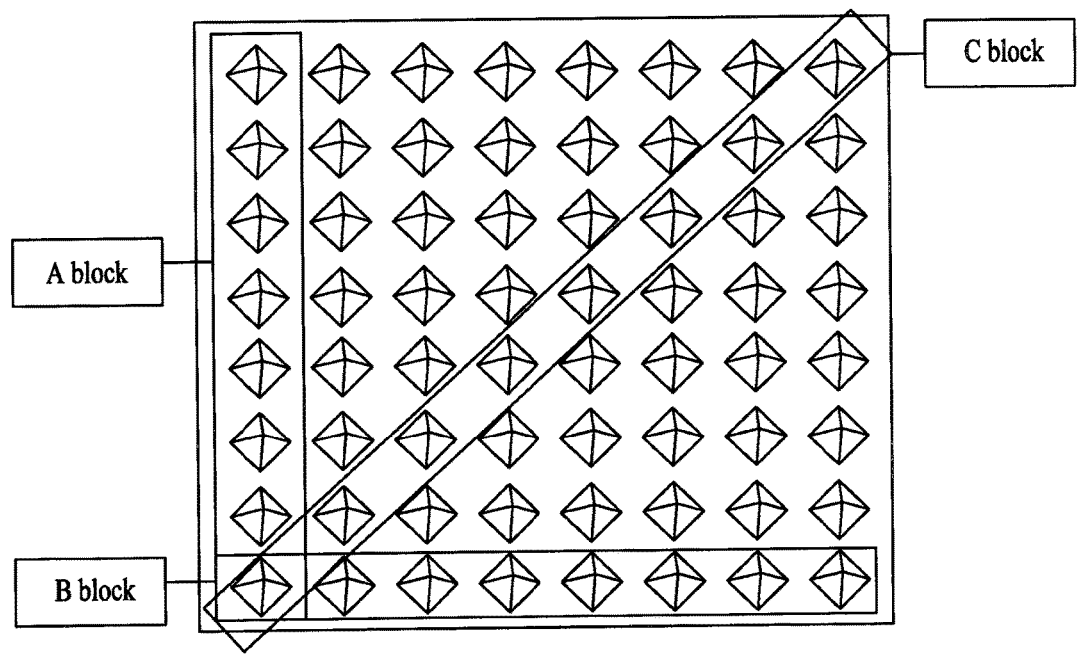
FIG. 6 is a diagram illustrating some antenna ports selected from the 2D antenna array of the wireless communication system to which an embodiment of the present invention is applied.

To transmit the EVI, the eNB may additionally configure a CSI-RS for verifying validity in addition to a CSI-RS (for example, CSI-RS corresponding to the block A and the block B of FIG. 6) for channel estimation through the Kronecker product.

FIG. 6 illustrates CSI-RSs for verifying validity of channel estimation through the Kronecker product according to an embodiment of the present invention. Referring to FIG. 6, the UE may verify validity of channel estimation through the Kronecker product using a separately configured block C in addition to the block A for estimating $H_V$ and the block B for estimating $H_H$. Thus, the eNB may define usage of each CSI-RS (for example, CSI-RS for estimating $H_V$, CSI-RS for estimating $H_H$, and CSI-RS for verifying validity of channel estimation through the Kronecker product) by configuring each CSI-RS, and report this information to the UE.

To measure a similarity between an actual channel H and a channel for some antenna ports, that is, a channel $H_K$ reconfigured through the Kronecker product of $H_V$ and $H_H$, the UE may use a correlation R between H and $H_K$ as a criterion. In this instance, the correlation R may be calculated as below.

$$R = \frac{\sum_{f \subset BW} H^H H_K}{\sqrt{\sum_{f \subset BW} H^H H} \sqrt{\sum_{f \subset BW} H_K^H H_K}} \quad \text{[Equation 3]}$$

$f \subset BW$ denotes a system bandwidth.

However, the UE may use only channels $H_C$ and $H_{K\_C}$ estimated from a predetermined part of ports (for example, the block C of FIG. 6) rather than the channels H and $H_K$ from the antenna ports. Thus, the UE may calculate the correlation R for the block C.

$$R_C = \frac{\sum_{f \subset BW} H_C^H H_{K\_C}}{\sqrt{\sum_{f \subset BW} H_C^H H_C} \sqrt{\sum_{f \subset BW} H_{K\_C}^H H_{K\_C}}} \quad \text{[Equation 4]}$$

In this instance, a relation between a channel correlation $R_C$ of selected ports and a channel correlation R of all ports is illustrated in FIGS. 7(a) and 7(b).

FIGS. 7(a) and 7(b) illustrate a simulation result of the relation between $R_C$ and R when the block C is configured as FIG. 6. As illustrated in FIGS. 7(a) and 7(b), R is accurately estimated from $R_C$. In particular, in a correlation area of interest (that is, FIG. 7(b)), $R_C$ and R have a linear relation, and validity of channel estimation based on $R_C$ is analogous to that based on R at a high probability. Thus, a correlation threshold $R_{C\_th}$ may be set using the relation. The UE may transmit EVI=1 to the eNB when $R_C < R_{C\_th}$, transmit EVI=0 to the eNB, otherwise. Alternatively, the UE may transmit EVI=0 when $R_C < R_{C\_th}$, and transmit EVI=1 to the eNB, otherwise.

Figure 7:
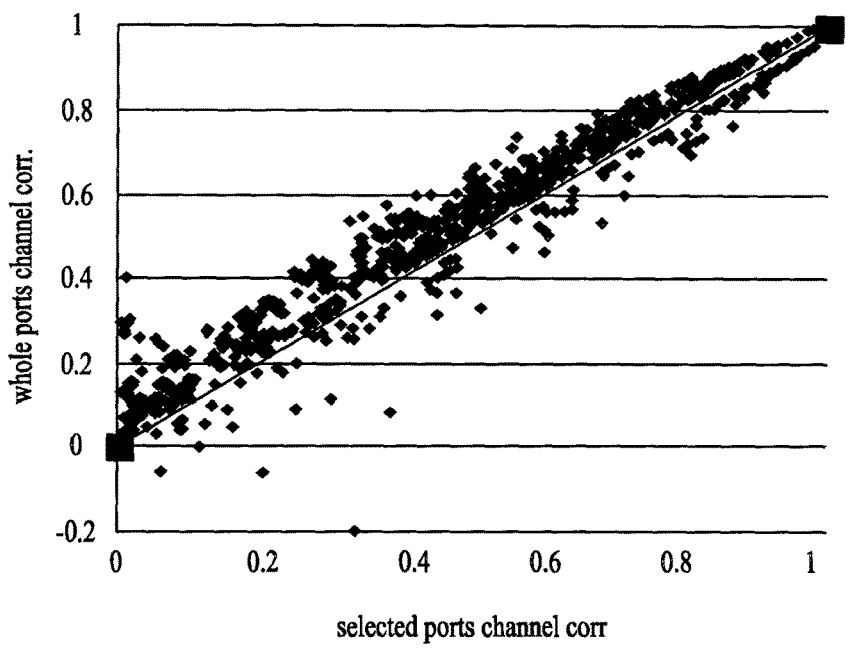
FIG. 7 is a graph illustrating a simulation result that indicates a relation between channel estimation using all antenna ports and channel estimation using some antenna ports.
Figure 7:
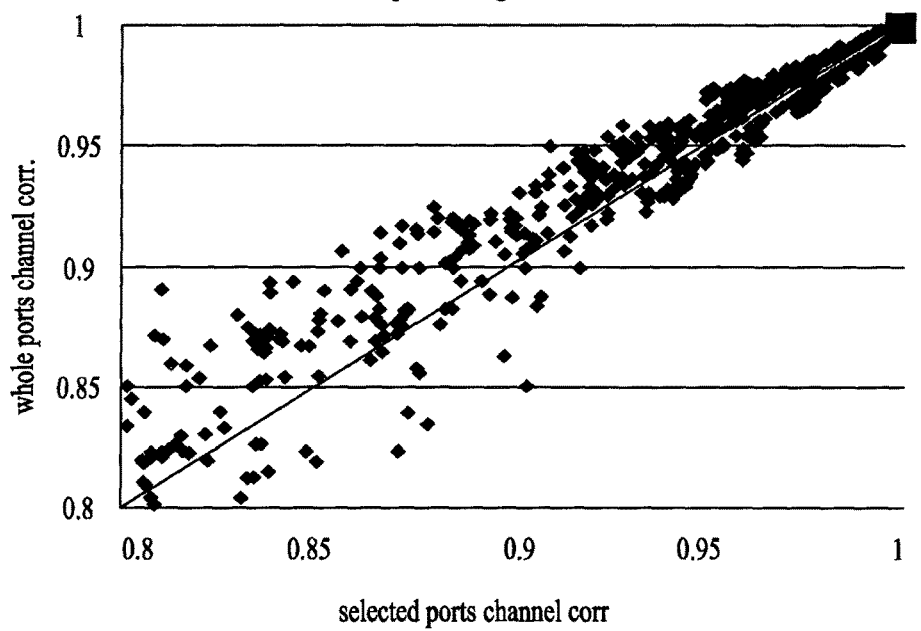
Figure 8:
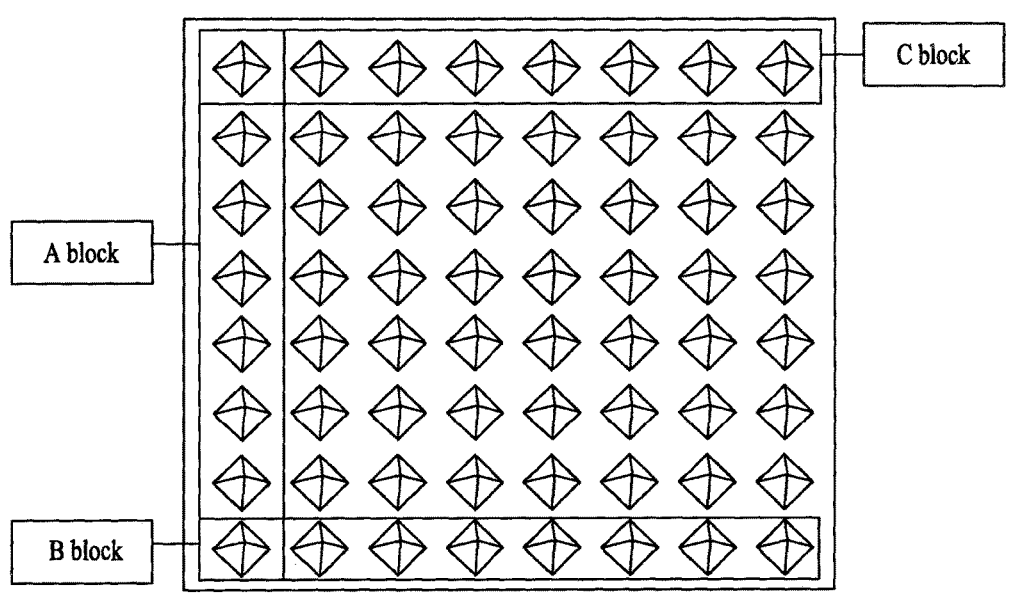
FIG. 8 is a diagram illustrating some antenna ports selected from the 2D antenna array of the wireless communication system to which an embodiment of the present invention is applied.

When the block C is selected as antenna ports different from the block C of FIG. 7, a relation between $R_C$ and R may change. For example, the block C may be selected as in FIG. 8. In this instance, FIG. 9 illustrates a relation between $R_C$ and R in a high correlation area.

Figure 9:
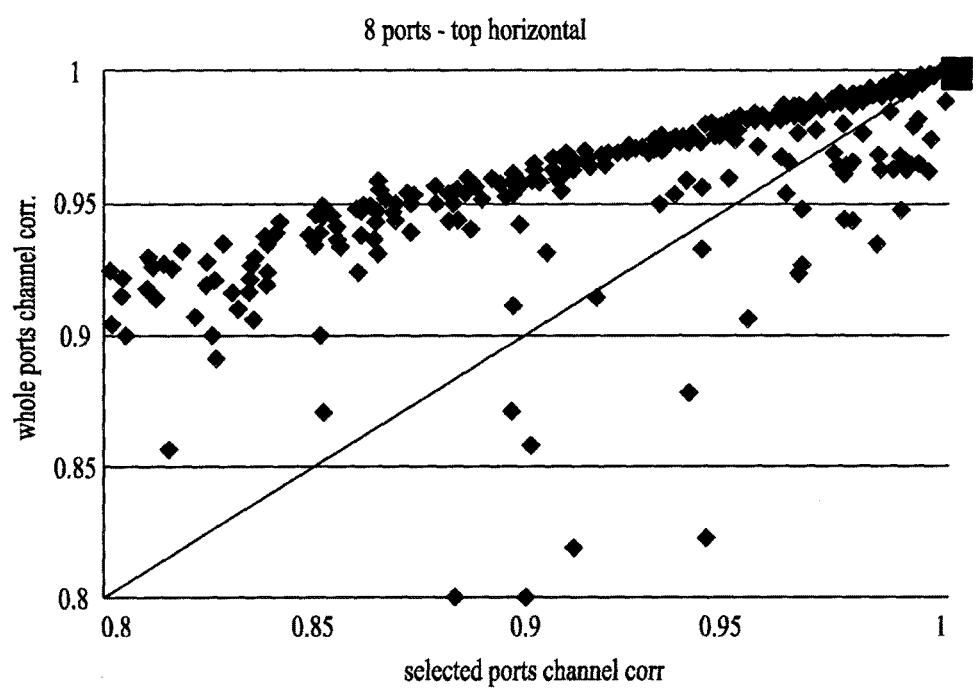
FIG. 9 is a graph illustrating a simulation result that indicates a relation between channel estimation using all antenna ports and channel estimation using some antenna ports.

Referring to FIG. 9, $R_C$ and R do not have a linear relation. Thus, if the block C is configured as in FIG. 8, $R_{C\_th}$ needs to be determined based on a relation between $R_C$ and R when $R_{C\_th}$ targeting a particular R is determined.

When the EVI equals 0, the UE may perform existing feedback on the assumption of channel estimation based on the Kronecker product. In this case, the UE may transmit five types of information of $RI_v$, $PMI_v$, $RI_h$, $PMI_h$, and CQI to the eNB. Here, $RI_v$ and $PMI_v$ are an RI and a PMI of antenna ports in the vertical direction, $RI_h$ and $PMI_h$ are an RI and a PMI of antenna ports in the horizontal direction, and CQI is integrated CQI of antenna ports in the vertical direction and antenna ports in the horizontal direction. The UE may reconfigure all channels $H_T$ based on $H_V$ estimated using the block A and $H_H$ estimated using the block B, and then feed $RI_v$, $PMI_v$, $RI_h$, $PMI_h$, and CQI, capable of most appropriately representing $H_T$, back.

When the EVI equals 1, the UE may similarly perform existing feedback. In this case, the UE may transmit five types of information of $RI_v$, $PMI_v$, $RI_h$, $PMI_h$, and CQI. However, $H_T$ may not be reconfigured using $H_V$ and $H_H$, and thus the UE may perform feedback by estimating an RI and a PMI with respect to and $H_H$.

Alternatively, when the EVI equals 1, channel information of either $H_V$ or $H_H$ may be transmitted. Among CSI-RS ports in the vertical direction or the horizontal direction, a CSI-RS port corresponding to a target of channel information feedback is predetermined by an RRC scheme, etc. In this case, the UE may perform feedback using a container such as a feedback chain which is used when the EVI equals 0 and a different feedback granularity from that used when the EVI equals 0.

When the UE transmits the EVI to the eNB, the EVI may be reported to the eNB through RRC signaling. In this case, even though dynamic resources are not additionally used, EVI information may be outdated due to a long delay between a point in time at which the EVI is measured and a point in time at which the EVI is applied.

Alternatively, the UE may transmit the EVI to the eNB through joint-encoding with long-term parameters such as RI or W1 of 8Tx precoding. In this case, while an existing feedback chain may be used without change, the CSI may be partially lost due to lack of a feedback container depending on circumstances.

Alternatively, the UE may use a new feedback scheme for transmission of the EVI. In this case, since a separate feedback scheme is introduced, the feedback container is sufficient, and optimization is easily performed.

TABLE 9

| Value of CSI request field | Description |
| --- | --- |
| '00' | No aperiodic CSI report is triggered |
| '01' | Aperiodic CSI report is triggered for a set of CSI process(es) configured by higher layers for serving cell $^c$ |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

The above Table is a part of aperiodic CSI request fields used in DCI format 0/4 of 3GPP LTE. When a new feedback scheme for transmission of the EVI is defined as aperiodic CSI, the eNB allocates a corresponding CSI process to a set of CSI processes corresponding to a particular CSI request field in the above Table. When transmission of the EVI is needed, the eNB requests the UE to transmit the EVI using a corresponding aperiodic CSI request, and the eNB may receive the EVI accordingly.

The UE may transmit a value greater than or equal to 1 bit that may assist in channel estimation instead of the EVI using the same scheme. For example, the UE may transmit, to the eNB, a PMI and an RI of channels estimated from three blocks of FIG. 6 using the aperiodic CSI. In this case, the eNB may perform more accurate channel estimation using the information.

Although a case in which channel estimation is performed using the Kronecker product is given as an example in the embodiments of the present invention, the present invention is applicable to all channel estimation schemes in which all channels are reconfigured using a part of all antenna ports.

Figure 10:
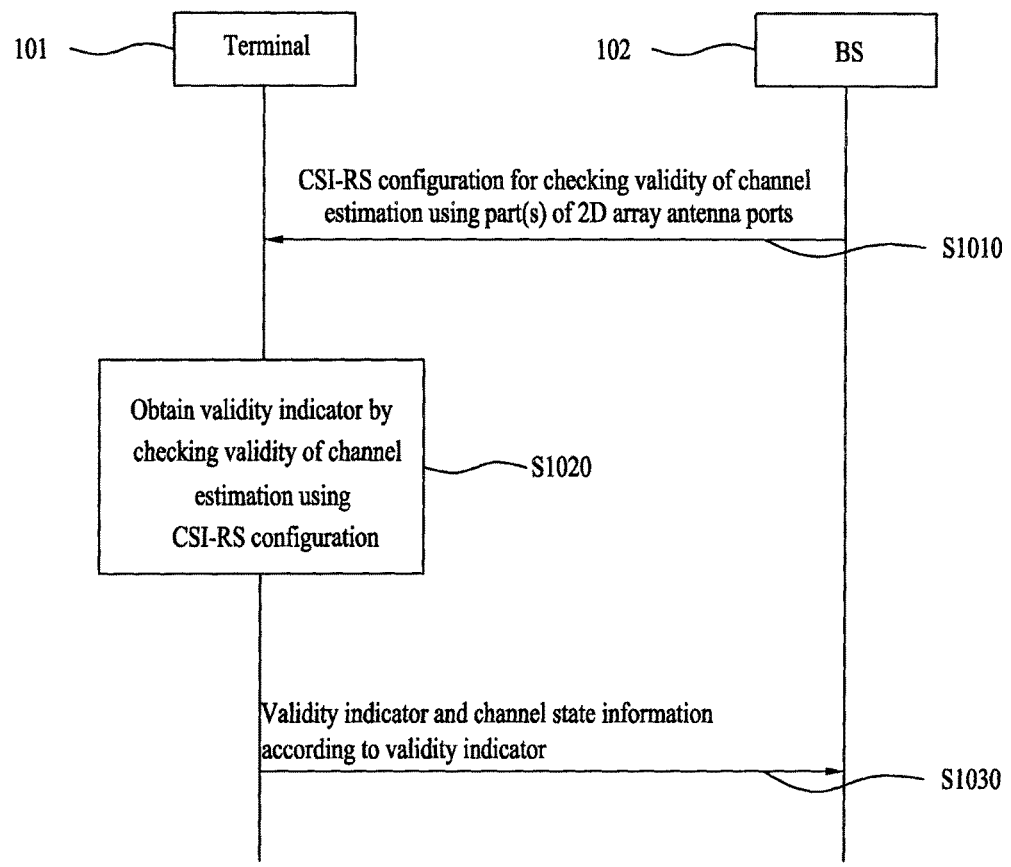
FIG. 10 is a diagram illustrating an operation of embodiment(s) of the present invention.

FIG. 10 illustrates an operation according to an embodiment of the present invention.

In S1010, a terminal 101 may receive, from a BS 102, a CSI-RS configuration for verifying validity of channel estimation using only a part of 2D array antenna ports configured for the terminal 101. The CSI-RS configuration for verifying validity of channel estimation may indicate eight antenna ports corresponding to one column or one row or eight diagonally positioned antenna ports in the 8 by 8 2D antenna array illustrated in FIG. 5 or FIG. 6. Preferably, the CSI-RS configuration (hereinafter, referred to as "partial port CSI-RS configuration") for verifying validity of channel estimation may indicate the antenna ports indicated by the block C of FIG. 6.

The validity of channel estimation is associated with whether estimation of channels for the all 2D array antenna ports through the channel estimation using only a part of the 2D array antenna ports is valid or invalid, in other words, reliability of the channel estimation.

In S1020, the terminal 101 may obtain a channel estimation validity indicator by verifying validity of the channel estimation using the CSI-RS configuration. The validity of the channel estimation may be verified by measuring a correlation between an actual channel from some antenna ports corresponding to the partial port CSI-RS configuration and a channel from some antenna ports obtained through channel estimation. The terminal 101 may determine a value of the channel estimation validity indicator by comparing the measured correlation with a threshold.

In S1030, the terminal 101 may transmit the channel estimation validity indicator and channel state information according to the channel estimation validity indicator.

The indicator may be set to 0 when the correlation is greater than or equal to the threshold, and set to 1 when the correlation is less than the threshold.

When the channel estimation validity indicator indicates that the channel estimation is valid, the channel state information may include an RI and a PMI for antenna ports corresponding to a particular column among the 2D array antenna ports, an RI and a PMI for antenna ports corresponding to a particular row among the 2D array antenna ports, and an integrated CQI for antenna ports corresponding to the particular column and the particular row.

When the channel estimation validity indicator indicates that the channel estimation is invalid, the channel state information may include an RI, a PMI and a CQI for antenna ports corresponding to a particular column among the 2D array antenna ports, or an RI, a PMI and a CQI for antenna ports corresponding to a particular row among the 2D array antenna ports.

The terminal 101 may receive information about some antenna ports from the BS 102. In addition, the channel estimation may correspond to a channel estimation scheme based on the Kronecker product.

Figure 11:
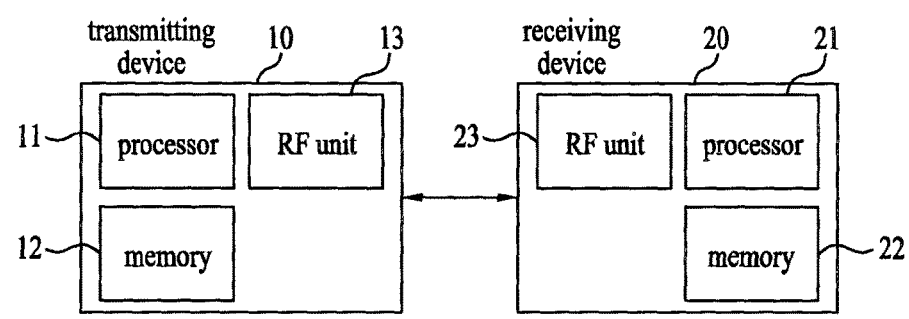
FIG. 11 is a block diagram illustrating devices for implementing embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

The invention claimed is:

1. A method for reporting a channel state of a terminal performed by the terminal, the method comprising:
   receiving, by the terminal, a channel state information-reference signal (CSI-RS) configuration for verifying validity of channel estimation using only a part of a two-dimensional (2D) array of antenna ports configured for the terminal;
   verifying, by the terminal, the validity of the channel estimation using the CSI-RS configuration; and
   obtaining, by the terminal, a channel estimation validity indicator; and
   transmitting, by the terminal on a physical uplink control channel (PUCCH) or a physical uplink shared channel (PUSCH), the channel estimation validity indicator and channel state information based on the channel estimation validity indicator.

2. The method according to claim 1, wherein the obtaining comprises:
   measuring, by the terminal, a correlation between an actual channel from a part of antenna ports corresponding to the CSI-RS configuration and a channel from some antenna ports obtained through the channel estimation; and
   determining, by the terminal, a value of the channel estimation validity indicator by comparing the measured correlation with a threshold.

3. The method according to claim 2, wherein the channel estimation validity indicator is set to 0 when the measured correlation is greater than or equal to the threshold, and the channel estimation validity indicator is set to 1 when the measured correlation is less than the threshold.

4. The method according to claim 1, wherein the channel state information includes a rank indicator (RI) and a precoding matrix indicator (PMI) for antenna ports corresponding to a specific column among the 2D array of antenna ports, an RI and a PMI for antenna ports corresponding to a specific row among the 2D array of antenna ports, and an integrated channel quality indicator (CQI) for antenna ports corresponding to the specific column and the specific row when the channel estimation validity indicator indicates that the channel estimation is valid.

5. The method according to claim 1, wherein the channel state information includes a rank indicator (RI), a precoding matrix indicator (PMI), and a channel quality indicator (CQI) for antenna ports corresponding to a specific column among the 2D array of antenna ports, or an RI, a PMI and a CQI for antenna ports corresponding to a specific row among the 2D array of antenna ports when the channel estimation validity indicator indicates that the channel estimation is invalid.

6. The method according to claim 1, further comprising receiving, by the terminal, information about the part of the 2D array of antenna ports configured for the terminal.

7. The method according to claim 1, wherein the channel estimation is based on a Kronecker product.

8. A terminal configured to cancel interference, the terminal comprising:
   a transmitter and a receiver; and
   a processor that controls the transmitter and the receiver,
   wherein the processor receives, using the receiver, a channel state information-reference signal (CSI-RS) configuration for verifying validity of channel estimation using only a part of a two-dimensional (2D) array of antenna ports configured for the terminal, verifies the validity of the channel estimation using the CSI-RS configuration, obtains a channel estimation validity indicator, and transmits, on a physical uplink control channel (PUCCH) or a physical uplink shared channel (PUSCH) using the transmitter, the channel estimation validity indicator and channel state information based on the channel estimation validity indicator.

9. The terminal according to claim 8, wherein the processor further measures a correlation between an actual channel from a part of antenna ports corresponding to the CSI-RS configuration and a channel from some antenna ports obtained through the channel estimation, and determines a value of the channel estimation validity indicator by comparing the measured correlation with a threshold.

10. The terminal according to claim 9, wherein the channel estimation validity indicator is set to 0 when the measured correlation is greater than or equal to the threshold, and the channel estimation validity indicator is set to 1 when the measured correlation is less than the threshold.

11. The terminal according to claim 8, wherein the channel state information includes an a rank indicator (RI) and a precoder matrix indicator (PMI) for antenna ports corresponding to a specific column among the 2D array of antenna ports, an RI and a PMI for antenna ports corresponding to a specific row among the 2D array of antenna ports, and an integrated channel quality indicator (CQI) for antenna ports corresponding to the specific column and the specific row when the channel estimation validity indicator indicates that the channel estimation is valid.

12. The terminal according to claim 8, wherein the channel state information includes a rank indicator (RI), a precoder matrix indicator (PMI), and a channel quality indicator (CQI) for antenna ports corresponding to a specific column among the 2D array of antenna ports, or an RI, a PMI, and a CQI for antenna ports corresponding to a specific row among the 2D array of antenna ports when the channel estimation validity indicator indicates that the channel estimation is invalid.

13. The terminal according to claim 8, wherein the processor further receives information about the part of the 2D array of antenna ports configured for the terminal.

14. The terminal according to claim 8, wherein the channel estimation is based on a Kronecker product.

* * * * *